(12) United States Patent
Kono et al.

(10) Patent No.: US 10,214,086 B2
(45) Date of Patent: Feb. 26, 2019

(54) PANEL STRUCTURE OF SUN ROOF

(71) Applicant: AISIN SEIKI KABUSHIKI KAISHA, Kariya-shi, Aichi-ken (JP)

(72) Inventors: Satoshi Kono, Anjo (JP); Tatsuya Matsui, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/685,286

(22) Filed: Aug. 24, 2017

(65) Prior Publication Data

US 2018/0072145 A1    Mar. 15, 2018

(30) Foreign Application Priority Data

Sep. 14, 2016    (JP) ................................. 2016-179754

(51) Int. Cl.

| | |
|---|---|
| *B60J 10/00* | (2016.01) |
| *B60J 10/82* | (2016.01) |
| *B60J 7/11* | (2006.01) |
| *B60J 7/043* | (2006.01) |
| *B60J 7/04* | (2006.01) |
| *B60J 7/02* | (2006.01) |

(52) U.S. Cl.

CPC ................ *B60J 10/82* (2016.02); *B60J 7/04* (2013.01); *B60J 7/043* (2013.01); *B60J 7/11* (2013.01); *B60J 7/022* (2013.01)

(58) Field of Classification Search

CPC ....... B60J 7/04; B60J 7/043; B60J 7/11; B60J 10/82

USPC ........................................ 296/216.09, 216.06
See application file for complete search history.

(56) References Cited

U.S. PATENT DOCUMENTS

| 1,942,489 | A | * | 1/1934 | Pfefferle | ............... | F16L 55/178 |
| | | | | | | 215/352 |
| 3,124,502 | A | * | 3/1964 | Radke | ...................... | F16J 15/20 |
| | | | | | | 277/536 |
| 3,784,215 | A | * | 1/1974 | Ruthenberg | ............... | F16J 9/14 |
| | | | | | | 251/306 |
| 3,913,955 | A | * | 10/1975 | Teja | ..................... | F01N 13/1805 |
| | | | | | | 285/337 |
| 5,111,879 | A | * | 5/1992 | Jozwiak | .................. | E21B 33/04 |
| | | | | | | 166/93.1 |
| 9,623,735 | B2 | * | 4/2017 | Akuzawa | ................. | B60J 7/043 |

(Continued)

FOREIGN PATENT DOCUMENTS

JP    2015-140084    8/2015

*Primary Examiner* — Dennis H Pedder
(74) *Attorney, Agent, or Firm* — Finnegan, Henderson, Farabow, Garrett & Dunner, LLP

(57) ABSTRACT

A panel structure of a sun roof includes: a panel; an inner panel that is made of a metal plate, is provided below the panel to extend along an edge portion of the panel, and has a recessed portion that is recessed downward and a flange portion that spreads outward along the panel over an entire periphery of the recessed portion; a sealing member that is made of a resin molding material having a constant cross section, is interposed between the flange portion and the panel over an entire periphery of the flange portion, and is bonded to a lower surface of the panel and an upper surface of the flange portion; and a covering member that is made of a resin material, is fixed to the panel, and is provided to cover the inner panel and the sealing member.

2 Claims, 3 Drawing Sheets

(56) References Cited

U.S. PATENT DOCUMENTS

2016/0165727 A1* 6/2016 Liskow ............ B29C 45/14311
361/803
2016/0185195 A1 6/2016 Akuzawa et al.

* cited by examiner

PANEL STRUCTURE OF SUN ROOF

CROSS REFERENCE TO RELATED APPLICATIONS

This application is based on and claims priority under 35 U.S.C. § 119 to Japanese Patent Application 2016-179754, filed on Sep. 14, 2016, the entire contents of which are incorporated herein by reference.

TECHNICAL FIELD

This disclosure relates to a panel structure of a sun roof.

BACKGROUND DISCUSSION

In the related art, as a panel structure of a sun roof, for example, a structure described in JP 2015-140084 (Reference 1) is known. The panel structure of a sun roof includes a panel (sun roof panel), an inner panel (holder) that is attached to a peripheral portion of a lower surface of the panel and has a recessed portion, a lid member that closes an opening of the recessed portion, and a resin covering member (holding member) that is molded so as to integrate the panel, the inner panel, and the lid member. The inner panel has a flange portion and the end portion of the lid member is clamped between an upper surface of the flange portion and a lower surface of the panel. The covering member has a clamped portion that intrudes into a space surrounded by the upper surface of the flange portion, the lower surface of the panel, and an end surface of the lid member, and the lid member is disposed over a pair of opening edge portions of the recessed portion and closes the recessed portion. The clamped portions are formed on both sides of the lid member with the recessed portion is interposed therebetween.

According to the configuration, since the opening of the recessed portion of the inner panel is closed by the lid member, resin that is a material of the covering member does not intrude into the recessed portion during molding the covering member. Therefore, it is possible to reduce the amount of resin used during molding the covering member and to reduce a mass of the panel structure as a whole by not disposing a spacer such as a foamed resin within the recessed portion.

However, in Reference 1, since the lid member closes an entirety of the opening of the recessed portion, it is necessary to set dimensions thereof depending on an opening width of the recessed portion. In other words, since different types of the lid members are required for the inner panels having different shapes of the recessed portions, versatility is impaired.

Thus, a need exists for a panel structure of a sun roof which is not susceptible to the drawback mentioned above.

SUMMARY

A panel structure of a sun roof according to an aspect of this disclosure includes a panel; an inner panel that is made of a metal plate, is provided below to extend along an edge portion of the panel, and has a recessed portion that is recessed downward and a flange portion that spreads outward along the panel over an entire periphery of the recessed portion; a sealing member that is made of a resin molding material having a constant cross section, is interposed between the flange portion and the panel over an entire periphery of the flange portion, and is bonded to a lower surface of the panel and an upper surface of the flange portion; and a covering member that is made of a resin material, is fixed to the panel, and is provided to cover the inner panel and the sealing member.

BRIEF DESCRIPTION OF THE DRAWINGS

The foregoing and additional features and characteristics of this disclosure will become apparent from the following detailed description considered with the reference to the accompanying drawings, wherein.

DETAILED DESCRIPTION

Hereinafter, an embodiment of a panel structure of a sun roof will be described.

Figure 1:
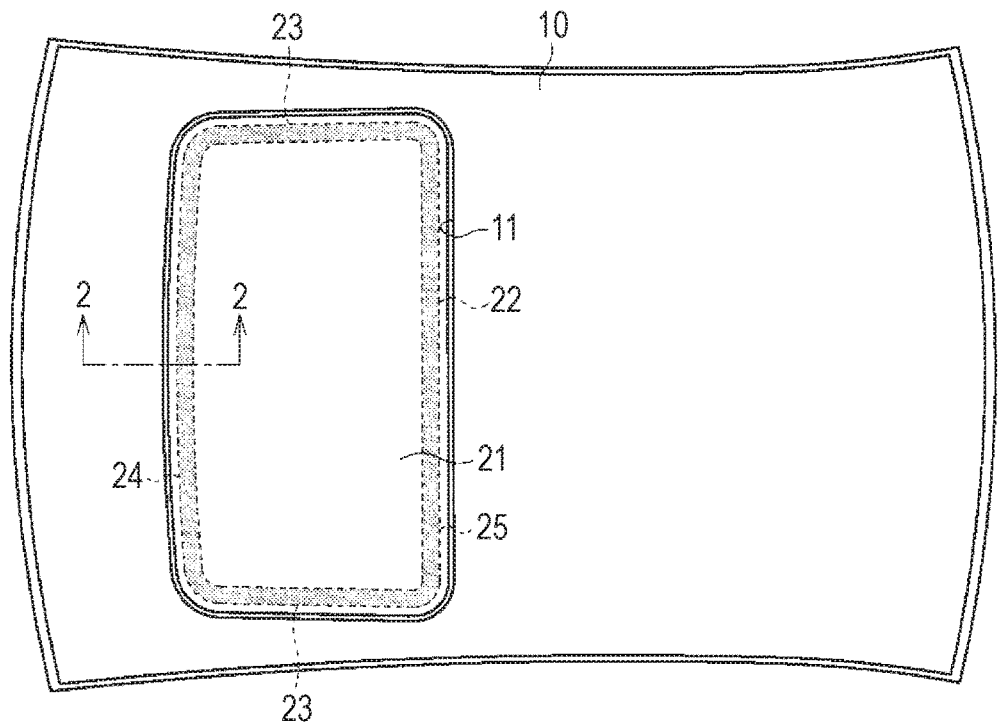
FIG. 1 is a plan view illustrating a roof to which an embodiment of a panel structure of a sun roof is applied.

As illustrated in FIG. 1, in a roof 10 of a vehicle such as an automobile, a substantially rectangular opening 11 is formed and a panel 21 capable of opening and closing the opening 11 is provided. The panel 21 is made of, for example, a resin material such as a glass material or polycarbonate which is molded into a substantially rectangular plate shape depending on a shape of the opening 11.

Moreover, a substantially rectangular annular frame 22 made of a metal plate (for example, an iron plate) is attached to the panel 21 so as to extend along an outer peripheral edge portion thereof downward (for the sake of convenience, a pattern is attached to be illustrated in FIG. 1). That is, the frame 22 has a pair of side frames 23, a front frame 24, and a rear frame 25 as an inner panel that is attached to the panel 21 respectively along both side edge portions of the panel 21 in a width direction of the vehicle, a front edge portion and a rear edge portion. Then, tips of each of the both side frames 23 and the front frame 24 are connected to each other and tips of each of the both side frames 23 and the rear frame 25 are connected to each other. The frame 22 is provided to reinforce the outer peripheral edge portion of the panel 21.

Next, the front edge portion of the panel 21 and a surrounding structure thereof will be described.

Figure 2:
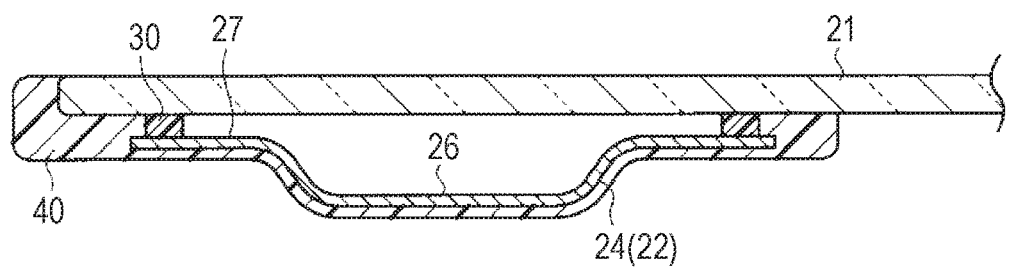
FIG. 2 is a sectional view that is taken along 2-2 of FIG. 1.
Figure 3:
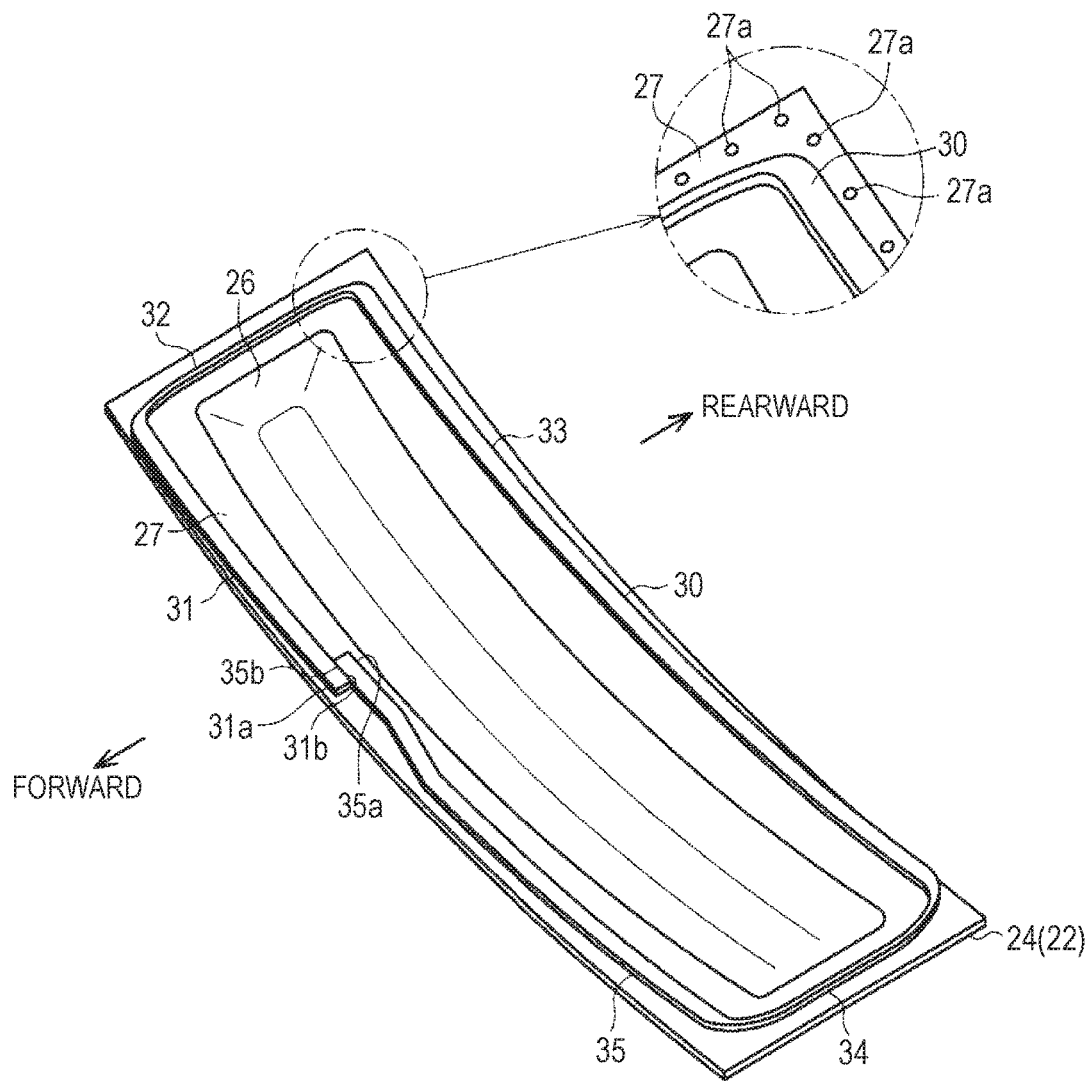
FIG. 3 is a perspective view and an enlarged view exaggeratingly illustrating features of a front frame and a sealing member of the panel structure of the sun roof of the same embodiment.

As illustrated in FIGS. 2 and 3, a recessed portion 26 which is recessed downward is formed in the front frame 24 so as to extend over a substantially entire length in a longitudinal direction and a flange portion 27 which spreads outward along the panel 21 is formed in the front frame 24 over an entire periphery of an opening of the recessed portion 26. Therefore, the flange portion 27 spreads in a substantially rectangular annular shape along the front edge portion of the panel 21.

A resin molding material having a constant cross section, more specifically, a sealing member 30 having a substantially rectangular cross section made of an extruded material of urethane sponge is bonded to an upper surface of the flange portion 27, for example, by adhesive over an entire periphery. The opening of the recessed portion 26 is surrounded by the sealing member 30 over the entire periphery thereof. That is, the sealing member 30 has a first laterally extending portion 31 which extends from an intermediate portion in a longitudinal direction thereof to one side (left upper side in FIG. 3) along a front edge portion of the flange portion 27 and a longitudinal extending portion 32 which is connected to the tip of the first laterally extending portion 31 and extends along a side edge portion of the flange portion 27. In addition, the sealing member 30 has a laterally extending portion 33 which is connected to the tip of the longitudinal extending portion 32 and extends to the other side (right lower side in FIG. 3) along a rear edge portion of the flange portion 27, and a longitudinal extending portion 34 that is connected to the tip of the laterally extending portion 33 and extends along the side edge portion of the flange portion 27. Furthermore, the sealing member 30 has a second laterally extending portion 35 which is connected to the tip of the longitudinal extending portion 34 and extends to the intermediate portion of the longitudinal direction thereof on one side along the front edge portion of the flange portion 27. Therefore, the first laterally extending portion 31 and the second laterally extending portion 35 are formed such that side surfaces 31b and 35b of both end portions 31a and 35a are in contact with each other in a state where the end portions 31a and 35a overlap each other in an extending direction (extending direction of the sealing member 30) thereof and the end portion 35a is deviated with respect to the end portion 31a on a side approaching the recessed portion 26. More precisely, the end portion 31a extends as it is along the extending direction of the first laterally extending portion 31 and the end portion 35a extends in a state of being deviated to a side approaching the recessed portion 26 with respect to the extending direction of the second laterally extending portion 35.

Moreover, as illustrated in FIG. 3 in an enlarged manner, a plurality of embossing patterns 27a are applied to the flange portion 27 to be spaced apart from each other on an outer periphery side substantially along an entire path of the sealing member 30. This facilitates bonding work by using the embossing patterns 27a as a guide when bonding the sealing member 30 to the upper surface of the flange portion 27.

As illustrated in FIG. 2, the sealing member 30 bonded to the upper surface of the flange portion 27 is bonded to a lower surface of the front edge portion of the panel 21, for example, by adhesive. That is, the sealing member 30 is interposed between the flange portion 27 and the panel 21 over an entire periphery of the flange portion 27. Therefore, the recessed portion 26 of the front frame 24 is surrounded by the lower surface of the front edge portion of the panel 21 and the sealing member 30 so as to be confined from the outside.

Outside surfaces of the front frame 24 and the sealing member 30 are covered by a rim 40 as a covering member which is fixed to the lower surface of the front edge portion and a front end surface of the panel 21 positioned on an outer peripheral side from the sealing member 30 and is formed of, for example, urethane resin. That is, the rim 40 is integrated with the panel 21 or the like by insert molding at the front edge portion of the panel 21 which is bonded to the front frame 24 and the sealing member 30 in advance.

Moreover, the same applies to the rear edge portion of the panel 21 and a surrounding structure thereof, and the rear frame 25 and the sealing member 30 are covered by the rim 40 that is fixed to the lower surface of the rear edge portion and a rear end surface of the panel 21 positioned on the outer peripheral side from the sealing member 30. In addition, the same is applied to the side edge portion of the panel 21 and a surrounding structure thereof. However, an attachment portion for an attaching function of components (not illustrated) related to an opening and closing operation of the panel 21 is formed in each side frame 23.

That is, the frame 22 is covered with the sealing member 30 so as to be continuous over the entire periphery by cooperation with the rim 40 of corresponding portions. Therefore, exposure of the metal plate to the peripheral portion of the panel 21 is eliminated.

Next, operations of the embodiment and effects thereof will be described.

(1) In the embodiment, the recessed portion 26 of the front frame 24 or the like is surround by the sealing member 30 interposed between the flange portion 27 and the panel 21 over the entire periphery of the flange portion 27 so as to be confined from the outside. Therefore, the resin that is the material of the rim 40 does not intrude into the recessed portion 26 during molding the rim 40. In this case, since the sealing member 30 is made of the resin molding material having the constant cross section, the resin molding material may be cut out so as to surround the recessed portion 26 according to the shape of the recessed portion 26 (cut length of the resin molding material may be changed). As described above, the sealing member 30 is made by using the resin molding material common to the frame 22 having a different shape of the recessed portion 26. Therefore, versatility can be further improved. Eventually, costs can be reduced.

(2) In the embodiment, since the sealing member 30 is made of the extruded material, the sealing member 30 (resin molding material) can be smoothly manufactured by the extrusion molding.

(3) In the embodiment, the side surfaces 31b and 35b of the both end portions 31a and 35a of the sealing member 30 are in contact with each other in a state where the both end portions 31a and 35a overlap each other. Therefore, it is necessary for the resin which intrudes into the recessed portion 26 during molding the rim 40 to change a flow path along a boundary portion between the side surfaces 31b and 35b of the both end portions 31a and 35a (so-called maze structure). Therefore, the resin that is the material of the rim 40 can be suppressed from intruding into the recessed portion 26 without bonding the side surfaces 31b and 35b of the both end portions 31a and 35a to each other.

(4) In the embodiment, since the sealing member 30 does not close the entire opening of the recessed portion 26, a material consumption amount for molding can be reduced and a mass can be reduced by that amount.

(5) In the embodiment, since the resin that is the material of the rim 40 does not intrude into the recessed portion 26, a bonding area between the resin (rim 40) and the panel 21 can be reduced and stress generation and peeling caused, for example, by expansion and shrinkage of the panel 21 and the rim 40 can be suppressed.

Moreover, the embodiment described above may be changed as follows.

Figure 4:
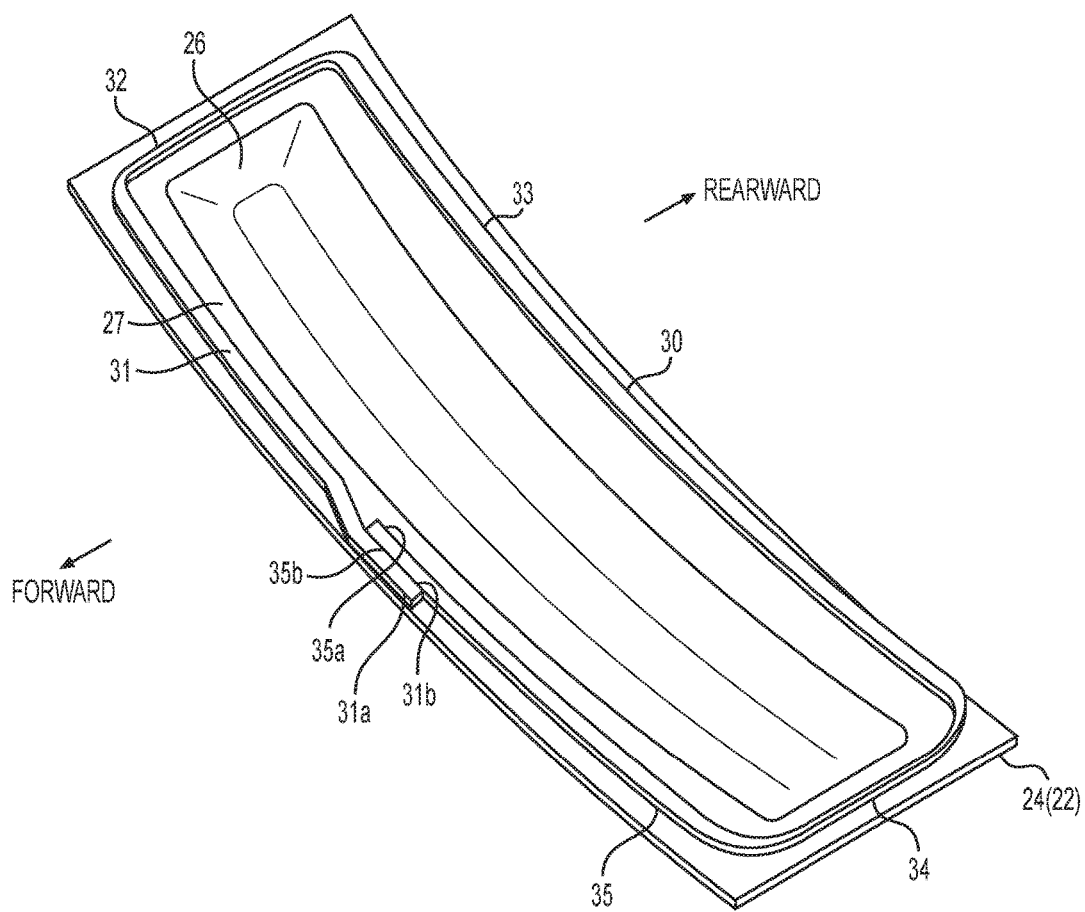
FIG. 4 is a perspective view illustrating features of a front frame and a sealing member of the panel structure of the sun roof of an alternative embodiment.

In the embodiment shown in FIG. 3, the end portion 31a extends as it is along the extending direction of the first laterally extending portion 31 and the end portion 35a extends in a state of being deviated to the side approaching the recessed portion 26 with respect to the extending direction of the second laterally extending portion 35. In the embodiment shown in FIG. 4, the end portion 35a may extend as it is along the extending direction of the second laterally extending portion 35 and the end portion 31a may extend in a state of being deviated to the side away from the recessed portion 26 with respect to the extending direction of the first laterally extending portion 31. Otherwise, the end portion 31a may extend in a state of being deviated to the side away from the recessed portion 26 with respect to the extending direction of the first laterally extending portion 31 and the end portion 35a may extend in a state of being deviated to the side approaching the recessed portion 26 with respect to the extending direction of the second laterally extending portion 35.

In the embodiment, the end portion 35a is deviated to the side approaching the recessed portion 26 with respect to the end portion 31a, but an arrangement relationship thereof may be opposite to each other. That is, the end portion 31a may be deviated to the side approaching the recessed portion 26 with respect to the end portion 35a. In this case, at least one of extending states may be provided in which the end portion 31a extends in a state of being deviated to the side approaching the recessed portion 26 with respect to the extending direction of the first laterally extending portion 31 and the end portion 35a extends in a state of being deviated to the side away from the recessed portion 26 with respect to the extending direction of the second laterally extending portion 35.

In the embodiment, the sealing member 30 extending over the entire periphery of the flange portion 27 may be cut out so that the tip surfaces of the both end portions 31a and 35a abut against each other. That is, one of the both end portions 31a and 35a may not be deviated to the side approaching the recessed portion 26 or to the side away from the recessed portion 26 with respect to the other. In addition, the sealing member 30 may be configured of a plurality of resin molding materials that are separated in at least two places in the entire periphery of the flange portion 27.

In the embodiment, the sealing member 30 may have a shape having a constant cross section of, for example, a substantially circular shape or a long circular shape. In brief, a bonding surface of the sealing member 30 may be a flat surface in a state of being bonded to the flange portion 27 or the panel 21.

In the embodiment, the sealing member 30 may not be the extruded material as long as the sealing member 30 is made of the resin molding material having the constant cross section.

In the embodiment, the shapes of the recessed portions 26 formed in the pair of side frames 23, the front frame 24, and the rear frame 25 may be the same as each other or different from each other.

In the embodiment, the recessed portion may not be provided in any one (for example, the side frames 23) of the pair of side frames 23, the front frame 24, and the rear frame 25.

In the embodiment, the tips of each side frame 23 and the front frame 24 may not be connected to each other. Similarly, the tips of each side frame 23 and the rear frame 25 may not be connected to each other. That is, any one of the pair of side frames 23, the front frame 24, and the rear frame 25 may be attached to the panel 21 while being separated from the others.

In the embodiment, any one of the pair of side frames 23, the front frame 24, and the rear frame 25 may be omitted.

In the embodiment, a plurality of recessed portions may be formed in the front frame 24. In this case, the sealing member may be bonded to the flange portion so as to surround the plurality of recessed portions individually or may be bonded to the flange portion so as to surround the plurality of recessed portions collectively. The same may be applied to each side frame 23 and the rear frame 25.

In the embodiment, a plurality of sub-frames of the front frame 24 which are divided in the extending direction thereof may be integrally connected. In this case, the recessed portion and the flange portion are formed in at least one of the plurality of sub-frames and the sealing member may be interposed between the sub-frame and the panel 21 over the entire periphery of the flange portion. The same may be applied to each side frame 23 and the rear frame 25.

In the embodiment, at least one of the side frames 23, the front frame 24, and the rear frame 25 may be made of a light metal such as aluminum alloy.

In the embodiment, the panel 21 may be a type that always closes the opening 11.

A panel structure of a sun roof according to an aspect of this disclosure includes a panel; an inner panel that is made of a metal plate, is provided below to extend along an edge portion of the panel, and has a recessed portion that is recessed downward and a flange portion that spreads outward along the panel over an entire periphery of the recessed portion; a sealing member that is made of a resin molding material having a constant cross section, is interposed between the flange portion and the panel over an entire periphery of the flange portion, and is bonded to a lower surface of the panel and an upper surface of the flange portion; and a covering member that is made of a resin material, is fixed to the panel, and is provided to cover the inner panel and the sealing member.

According to this configuration, the recessed portion of the inner panel is enclosed by the sealing member interposed between the flange portion and the panel over the entire periphery of the flange portion so as to be confined by the sealing member from the outside. Therefore, resin that is the material of the covering member does not intrude into the recessed portion during molding the covering member. In this case, since the sealing member is made of the resin molding material having the constant cross section, the resin molding material may be cut out so that the recessed portion can be enclosed to match a shape of the recessed portion. As described above, the sealing member is made of the resin molding material which is common with respect to the inner panels having different shapes of the recessed portions. Therefore, versatility can be further improved.

In the panel structure of a sun roof, it is preferable that the sealing member is made of an extruded material.

According to this configuration, the sealing member (resin molding material) can be smoothly manufactured by extrusion molding.

In the panel structure of a sun roof, it is preferable that one of both end portions of the sealing member is deviated with respect to the other of the both end portions on a side approaching the recessed portion or a side going away from the recessed portion so that side surfaces of the both end portions are in contact with each other in a state where the both end portions overlap each other in an extending direction thereof.

According to this configuration, the side surfaces of the both end portions of the sealing member are in contact with each other in a state where the both end portions overlap each other. Therefore, it is necessary for the resin which intrudes into the recessed portion during molding the covering member to change a flow path along a boundary portion between the side surfaces of the both end portions. Therefore, the resin that is a material of the covering member can be suppressed from intruding into the recessed portion without bonding the side surfaces of the both end portions to each other.

This disclosure has an effect that can further improve versatility.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A panel structure of a sun roof comprising:
   a panel;
   an inner panel that is made of a metal plate, is provided below the panel to extend along an edge portion of the panel, and has a recessed portion that is recessed downward and a flange portion that spreads outward along the panel over an entire periphery of the recessed portion;
   a sealing member that is made of a resin molding material having a constant cross section, is interposed between the flange portion and the panel over an entire periphery of the flange portion, and is bonded to a lower surface of the panel and an upper surface of the flange portion; and
   a covering member that is made of a resin material, is fixed to the panel, and is provided to cover the inner panel and the sealing member, wherein
   one of both end portions of the sealing member is deviated with respect to the other of the both end portions on a side approaching the recessed portion or a side going away from the recessed portion so that side surfaces of the both end portions are in contact with each other in a state where the both end portions overlap each other in an extending direction thereof.

2. The sunroof apparatus according to claim 1, wherein the sealing member is made of an extruded material.

* * * * *